United States Patent
Rey

(10) Patent No.: US 10,926,792 B2
(45) Date of Patent: Feb. 23, 2021

(54) CYCLOIDAL REDUCER WITH BACKLASH SELF-ADJUSTMENT AND POWER STEERING SYSTEM WITH SUCH A REDUCER

(71) Applicant: JTEKT EUROPE, Irigny (FR)

(72) Inventor: Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 36 days.

(21) Appl. No.: 16/094,103

(22) PCT Filed: Apr. 21, 2017

(86) PCT No.: PCT/FR2017/050943
§ 371 (c)(1),
(2) Date: Oct. 16, 2018

(87) PCT Pub. No.: WO2017/187055
PCT Pub. Date: Nov. 2, 2017

(65) Prior Publication Data
US 2019/0047610 A1    Feb. 14, 2019

(30) Foreign Application Priority Data

Apr. 25, 2016   (FR) ..................................... 16/53628

(51) Int. Cl.
*B62D 5/04* (2006.01)
*F16H 1/28* (2006.01)
(Continued)

(52) U.S. Cl.
CPC ............ *B62D 5/0421* (2013.01); *B62D 5/04* (2013.01); *F16H 1/2863* (2013.01); *F16H 1/32* (2013.01);
(Continued)

(58) Field of Classification Search
None
See application file for complete search history.

(56) References Cited

U.S. PATENT DOCUMENTS 4,549,450 A * 10/1985 Pierrat ...................... F16H 1/48
475/168
4,922,781 A *  5/1990 Peiji ........................ F16H 55/08
74/462

(Continued)

FOREIGN PATENT DOCUMENTS

EP   0 086 393 A2   8/1983
EP   0 087 743 A2   9/1983
(Continued)

OTHER PUBLICATIONS

JP61084439A translation (Year: 1986).*
Aug. 3, 2017 International Search Report issued in International Patent Application No. PCT/FR2017/050943.

*Primary Examiner* — Timothy Hannon
(74) *Attorney, Agent, or Firm* — Oliff PLC

(57) ABSTRACT

A cycloidal gear pair reducer including an input shaft, mounted in a reducer casing such that it rotates about an axis referred to as "main axis", an eccentric member carried by the input shaft and rotated by the latter, at least one cycloidal disc rotatably mounted on the eccentric member and having a cycloidal toothing, at least one ring gear provided with a receiving toothing with which the cycloidal toothing of the cycloidal disc meshes, and an output shaft; wherein the reducer comprises a suspension device arranged to return elastically the cycloidal toothing of the cycloidal disc and the receiving toothing of the ring gear towards one another such that the meshing backlash between the cycloidal disc and the ring gear is self-adjusted along at least one radial component relative to the main axis.

9 Claims, 5 Drawing Sheets

(51) Int. Cl.
*F16H 1/32* (2006.01)
*F16H 55/56* (2006.01)

(52) U.S. Cl.
CPC ..... *F16H 55/566* (2013.01); *F16H 2001/324* (2013.01)

(56) References Cited

U.S. PATENT DOCUMENTS

| | | | |
|---|---|---|---|
| 5,145,468 A * | 9/1992 | Nagabhusan | F16H 1/32 475/169 |
| 2011/0319217 A1* | 12/2011 | Imase | F16H 1/32 475/168 |
| 2015/0211392 A1 | 7/2015 | Otsubo et al. | |

FOREIGN PATENT DOCUMENTS

| | | | |
|---|---|---|---|
| EP | 0 474 897 A1 | 3/1992 | |
| EP | 0 931 714 A1 | 7/1999 | |
| FR | 1 351 031 A | 1/1964 | |
| FR | 3 001 518 A1 | 8/2014 | |
| GB | 999 326 A | 7/1965 | |
| JP | 61084439 A * | 4/1986 | ............... F16H 1/32 |

\* cited by examiner

CYCLOIDAL REDUCER WITH BACKLASH SELF-ADJUSTMENT AND POWER STEERING SYSTEM WITH SUCH A REDUCER

The present invention concerns the general field of the gear reducers, and more particularly the field of cycloidal gear reducers (more simply called «cycloidal reducers»), which provide a movement transmission between an input shaft and an output shaft in order to reduce the rotational speed in favor of an increase in the transmitted torque.

The invention concerns more specifically the application of such reducers to a power steering system for a vehicle.

It is already known, in particular by the patent EP-0 086 393, a cycloidal reducer within which an input shaft drives, by means of an eccentric member, such as a cam, an input disk which is provided with a cycloidal toothing and which meshes with an input rim comprising a series of teeth formed by rollers implanted in a circle in said input rim. Said reducer also comprises an output disk, which is driven in rotation by the input disk and which is also provided with a cycloidal toothing which meshes with an output rim, secured to an output shaft, and whose toothing is formed by a series of rollers.

A drawback of such cycloidal gear reducers is the presence of a backlash between the toothing of each cycloidal disk and the toothing of the corresponding rim, said backlash possibly being at the origin of shocks and operating noises, in particular when the direction of rotation of said reducer is reversed.

Such a drawback may even hinder the use of such a reducer within mechanisms which are, by nature, subjected to frequent reversals of their direction of rotation, as is the case for power steering mechanisms whose direction of rotation is modified at each steering reversal, that is to say each time the driver changes the direction in which he maneuvers the steering wheel.

In order to overcome this drawback and adjust the radial clearance between the disk and the rim, the aforementioned patent does indeed provide an eccentric setting mechanism, which allows individually setting, and then blocking by a blocking screw, the position of the axis of each roller of the rim, and thereby adjusting the pressure of each roller of the rim against the toothing of the corresponding cycloidal disk.

However, although it actually allows obtaining a backlash adjustment, such a setting mechanism still has many drawbacks.

First, the manufacture of the corresponding cycloidal reducer requires a very large number of parts, including in particular the rollers, roller axes, eccentric nuts receiving the roller axes, blocking screws, etc., and further imposes, for some of said parts, particularly accurate fitting tolerances.

The manufacture, assembly and setting of such a reducer are therefore particularly long and expensive.

Furthermore, it is difficult to obtain a homogeneous pre-load from one roller to another, so that the setting mechanism may sometimes be too loose, either from the beginning or because it gets out of setting over time, or else on the contrary sometimes too tight.

In the first case, a too weak pre-load does not allow obtaining a satisfactory and lasting adjustment of the backlash, whereas in the other case, a too strong pre-load tends to cause premature wear, and even a blocking or a destruction of the reducer.

For all these reasons, the known cycloidal reducers are in practice unsuitable, and in fact discarded, in a certain number of applications, in particular when it is concretely desired to provide a power and movement transmission within a power steering system.

Consequently, the objects assigned to the invention aim at overcoming the aforementioned drawbacks and at proposing a new type of simplified, light and compact cycloidal reducer, which is easy and inexpensive to manufacture, and which has little backlash, while having increased service life and reliability.

The objects assigned to the invention are achieved by means of a cycloidal gear reducer comprising an input shaft, mounted in rotation in a reducer casing according to an axis called «main axis» (ZZ'), an eccentric member carried by the input shaft and driven in rotation by the latter, at least one cycloidal disk which is mounted in rotation on said eccentric member and which is provided with a cycloidal toothing, at least one rim provided with a receiving toothing on which the cycloidal toothing of the cycloidal disk meshes, and an output shaft, distinct from the input shaft, which is arranged so as to be driven in rotation by the cycloidal disk, said reducer being characterized in that it comprises a suspension device which is arranged to elastically bias the cycloidal toothing of the cycloidal disk and the receiving toothing of the rim against each other, so as to provide an automatic adjustment of the backlash between said cycloidal disk and said rim according to at least one component radial to the main axis (ZZ').

Advantageously, the implementation of a suspension device according to the invention, capable of being elastically deformed to accommodate the possible radial gaps between the toothing of the cycloidal disk and the receiving toothing of the rim, allows automatically, permanently, pressing the portion of the toothing of the cycloidal disk which meshes with the rim against the corresponding portion of the receiving toothing of the rim.

The cycloidal reducer according to the invention therefore has an excellent ability to elastically, and consequently in an automatic, flexible and seamless manner, accommodate the variations in the radial position of the toothing of the cycloidal disk relative to the radial position of the corresponding receiving toothing of the rim, whether these variations are caused by manufacturing tolerances of the disk and the rim, by assembly tolerances of the different parts constitutive of the reducer, or else by wearing of the reducer.

As such, it should be noted that, in a particularly advantageous manner, the suspension device according to the invention may thus fulfill two functions.

The first function consists in guaranteeing, during the operation of assembling the reducer, an assembly clearance which is sufficient to enable the axial insertion of the cycloidal disk, and more generally of the input shaft, within the rim, without interference, and that regardless of the respective manufacturing tolerances of the rim and the cycloidal disk.

Indeed, the radial travel which is offered by the elastic stroke of the suspension device (that is to say the range over which said suspension device is free to be elastically deformed) allows adjusting radially the position of the cycloidal disk relative to the rim, and more particularly removing (taking off) radially, where needed, the toothing of the disk from the corresponding receiving toothing of the rim, for example by pushing back temporarily (the time required for the axial engagement of the disk in the rim) the disk against the suspension device, so as to provisionally create or preserve between the disk and the rim a radial assembly clearance which allows sliding the input shaft and the disk in the rim with a relatively accurate guidance, but seamlessly and without blocking.

The second function consists in a backlash automatic adjustment function, after assembly and during normal operation of the reducer, the elastic stroke offered by said suspension device allowing indeed compensating automatically and smoothly, without exerting excessive stresses on the toothings, for the initial static assembly clearance, and then the dynamic variations affecting the primitive gear circles of the disk and the rim (that is to say the dynamic variations in the axes spacing between the toothing of the disk and the toothing of the rim) which are due to manufacturing and assembly tolerances or to progressive wearing of the reducer.

The invention therefore allows facilitating the assembly of the cycloidal reducer, and then improving the quality of the meshing as well as the service life of said reducer.

Other objects, features and advantages of the invention will appear, in more detail, on reading the following description, as well as using the appended drawings, provided for purely illustrative and non-limiting purposes, among which:

Figure 9:
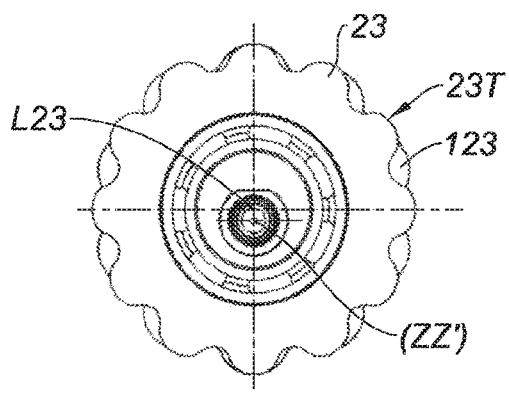
Figure 10:
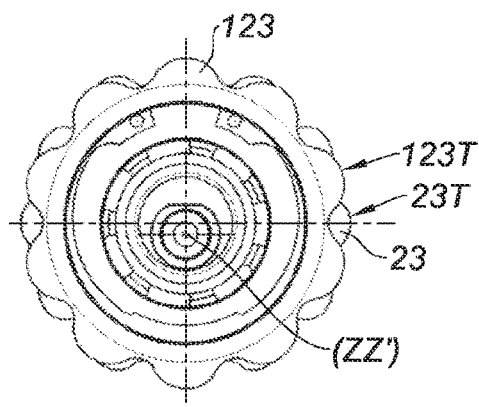

FIGS. 9 and 10 illustrate, in projection views in a plane normal to the main axis (ZZ'), respectively from the input shaft and from the output shaft, a subset of a reducer with two reduction stages, comprising two cycloidal disks suspended in their entirety by the same suspension device interposed between the eccentric bearing and said disks, as is the case within the different variants of FIGS. 11 to 18.

Figure 11:
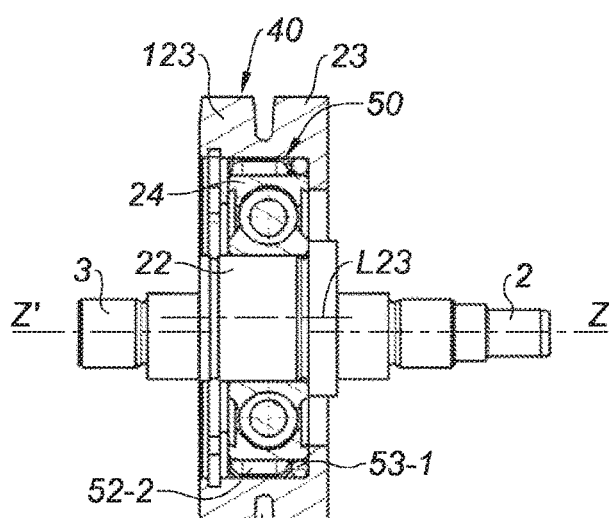

FIG. 11 illustrates, in a sectional view along the main axis (ZZ'), the detail of a second variant of a reducer according to the invention.

Figure 12:
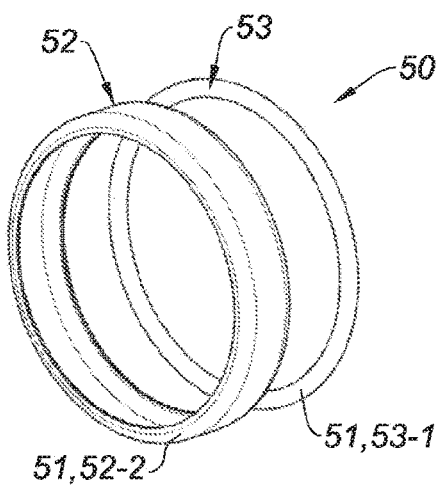

FIG. 12 illustrates, in a perspective view, the suspension device used within the second variant of a reducer of FIG. 11, and comprising a spring member, herein a C-shaped leaf spring, associated to a damping member, here an O-ring.

Figure 13:
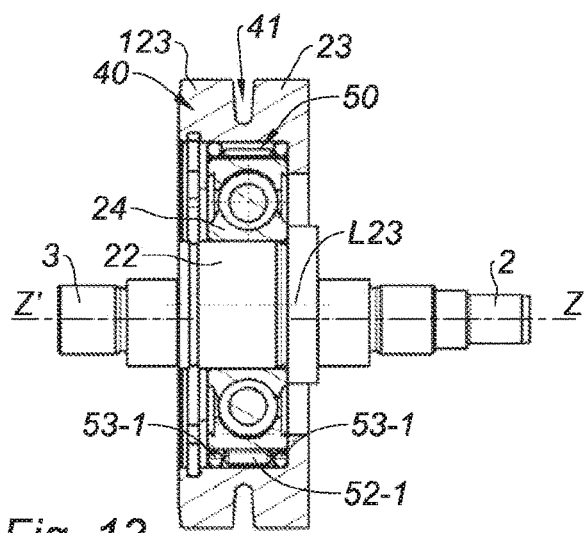

FIG. 13 illustrates, in a sectional view along the main axis (ZZ'), the detail of a third variant of a reducer according to the invention.

Figure 14:
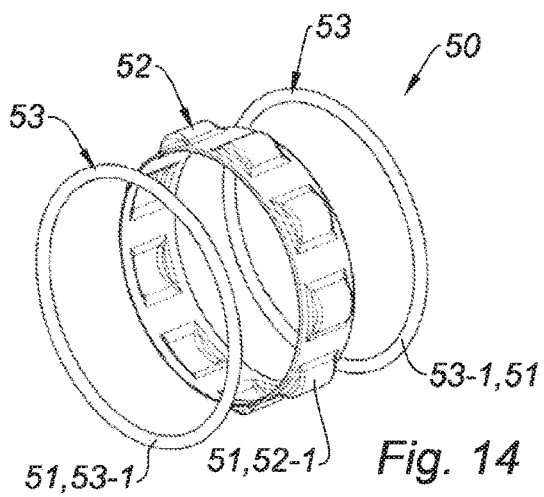

FIG. 14 illustrates, in a perspective view, the suspension device used within the third variant of a reducer of FIG. 13, comprising a spring, herein a corrugated leaf spring, placed axially between two damping members, herein O-rings.

Figure 15:
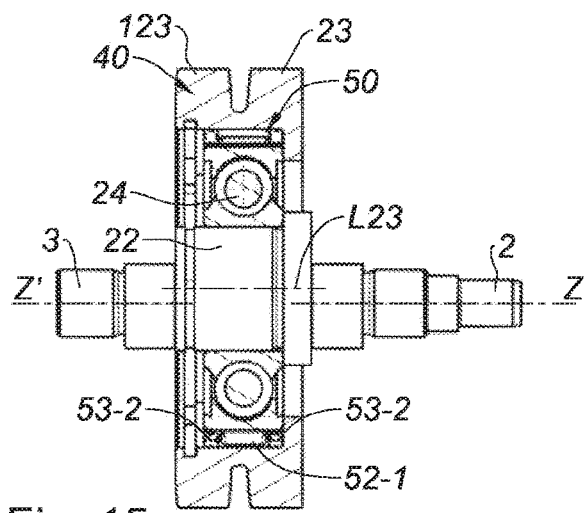

FIG. 15 illustrates, in a sectional view along the main axis (ZZ'), the detail of a fourth variant of a reducer according to the invention.

Figure 16:
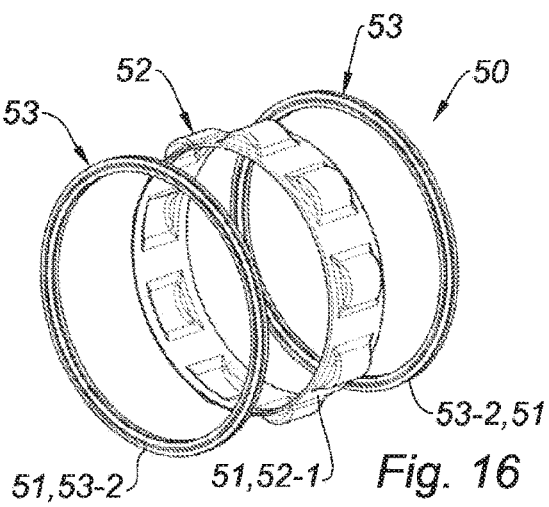

FIG. 16 illustrates, in a perspective view, the suspension device used within the fourth variant of a reducer of FIG. 15, comprising a spring, herein a corrugated leaf spring, placed axially between two damping members, herein formed by four-lobed joints.

Figure 17:
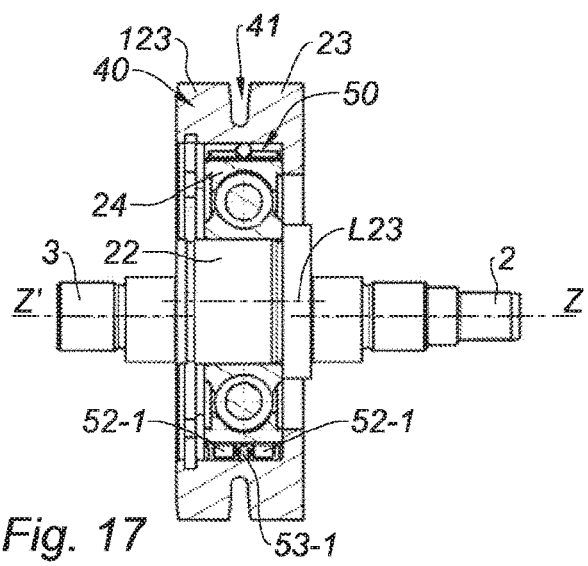

FIG. 17 illustrates, in a sectional view along the main axis (ZZ'), the detail of a fifth variant of a reducer according to the invention.

Figure 18:
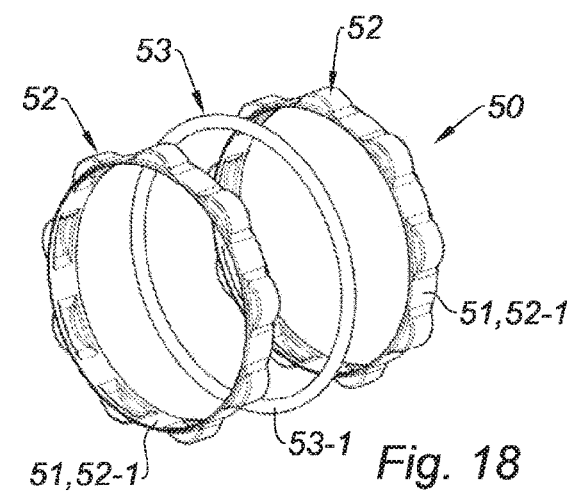

FIG. 18 illustrates, in a perspective view, the suspension device used within the fifth variant of a reducer of FIG. 17, and comprising two springs, herein corrugated leaf springs, placed axially on either side of a damping member, herein formed by an O-ring.

Figure 19:
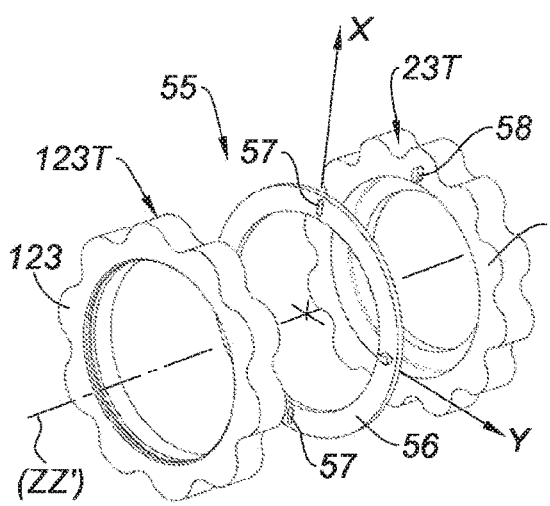
Figure 20:
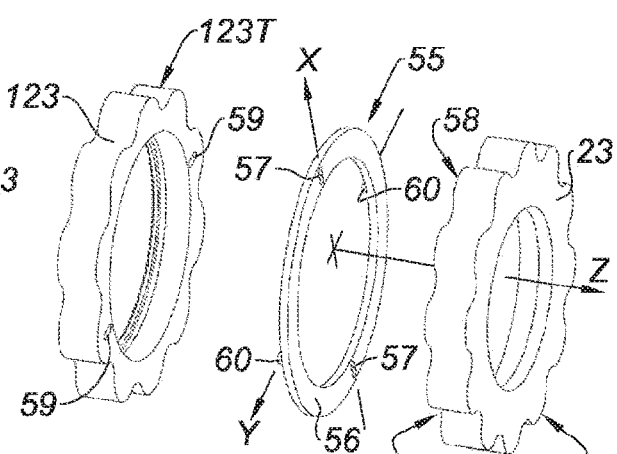
Figure 21:
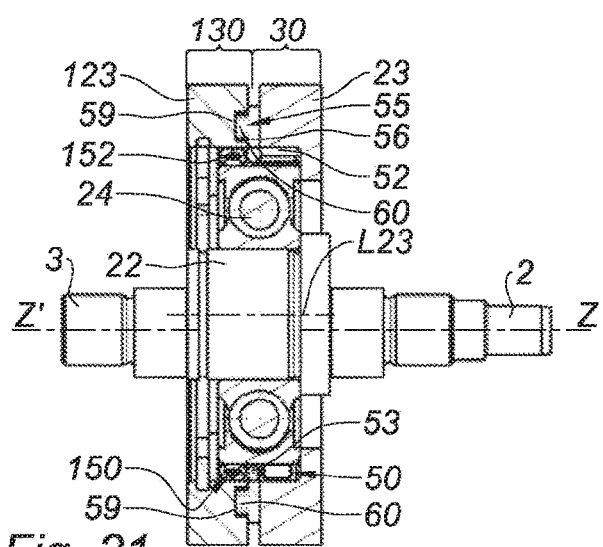
Figure 23:
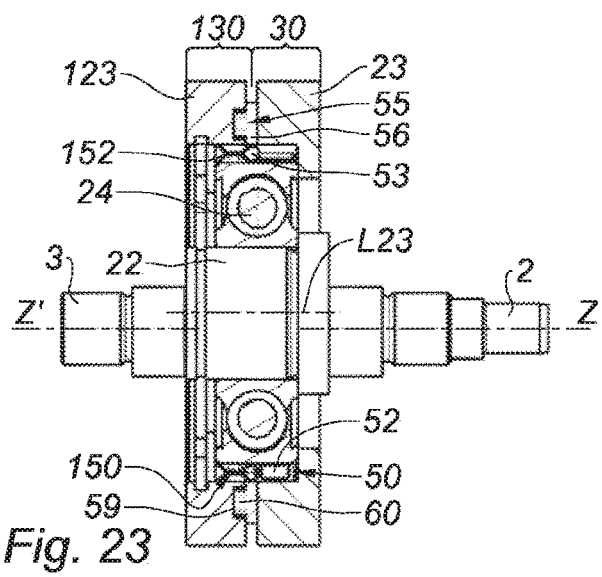

FIGS. 19 and 20 illustrate, in perspective views, the detail of a disks subset comprising two cycloidal disks coupled according to an Oldham coupling type connection via a coupling washer, as implemented within the variants of FIGS. 21 and 23.

FIG. 21 illustrates, in a sectional view along the main axis (ZZ'), the detail of a sixth variant of a reducer according to the invention, comprising two cycloidal disks coupled by an Oldham coupling.

Figure 22:
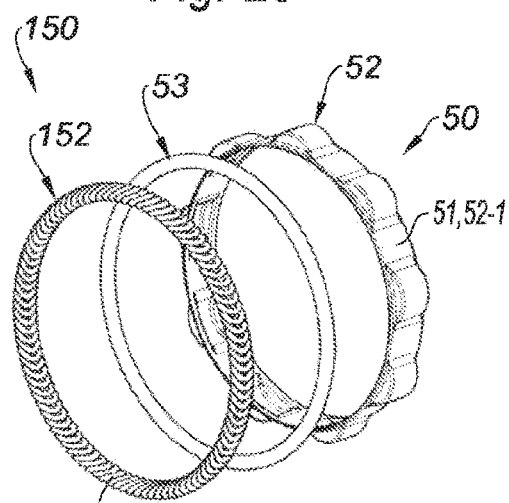

FIG. 22 illustrates, in a perspective view, the suspension device used within the sixth variant of a reducer of FIG. 21, comprising a first spring, herein a corrugated leaf spring, providing the suspension of the first disk, a second spring, herein an annular helical spring, providing the suspension of the second disk, and a damping member, herein an O-ring, interposed axially between the two springs, opposite the coupling washer.

FIG. 23 illustrates, in a sectional view along the main axis (ZZ'), the detail of a seventh variant of a reducer according to the invention, comprising two cycloidal disks coupled by an Oldham coupling.

Figure 24:
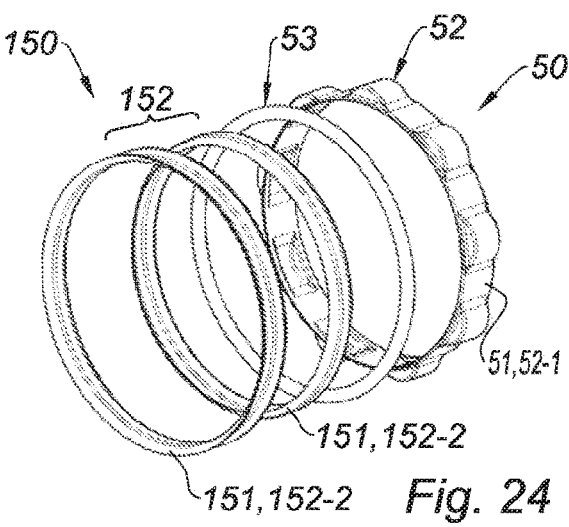

FIG. 24 illustrates, in a perspective view, the suspension device used within the seventh variant of a reducer of FIG. 21, comprising a first spring, herein a corrugated leaf spring, providing the suspension of the first disk, a second spring, herein formed by a pair of C-shaped leaf springs which are opposite back to back, which provides the suspension of the second disk, and a damping member, herein an O-ring, interposed axially between the two springs, opposite the coupling washer.

The present invention concerns a cycloidal gear reducer 1, also called «cycloidal reducer» 1 (hereinafter «reducer» 1).

Such a reducer 1 advantageously enables a transmission and a conversion of movement and/or effort, and therefore a transmission and a conversion of mechanical power, between an input shaft 2, which receives the motive power to be transmitted, and an output shaft 3, which transmits said motive power downstream of the reducer 1.

The term «reducer» 1 may herein refer indifferently to either a mechanism actually intended to impart a reduction, that is to say used to reduce the speed and increase the transmitted torque, the reducer 1 then being arranged in a configuration called «direct configuration» such that the output shaft 3 rotates at an output rotational speed ω3 lower than the input rotational speed ω2 of the input shaft 2 but by developing an output torque T3 higher than the input torque T2 exerted on said input shaft 2, or a multiplier mechanism, the reducer 1 then being arranged in a configuration called «reverse configuration» such that the output shaft 3 rotates faster than the input shaft 2, but by developing a torque T3 lower than that T2 supplied to the input shaft 2.

Preferably, the reducer 1 will be a reversible mechanism, which is able to selectively adopt either the direct configuration, or the reverse configuration simply by switching the roles of the input shaft 2 and the output shaft 3.

For simple convenience of description, it will be considered in the following that the reducer 1 is in direct configuration, and assumes a function of reducing a rotational speed between the input shaft 2 and the output shaft 3.

Moreover, the reducer 1 preferably has a bi-directional operation, in that it can transmit both a clockwise rotational movement and, on the contrary, a counterclockwise rotational movement.

Of course, the reducer 1 according to the invention may be coupled to any movement (and effort) transmission mechanical system, and more particularly be used at the output of any type of rotating machine, such as a motor, a turbine, a wind turbine or a hydro-turbine, or else in association with any type of rotary mechanism, with motorized or manual drive, such as a pedal, a winch (in particular a crank winch), a clock movement (automatic winding), etc.

Nonetheless, according to a particularly preferred application variant, the reducer 1 according to the invention will be used within a power steering system 4, intended for a vehicle, preferably for a motor vehicle, and will preferably be configured to provide a reduction function within said power steering system 4.

Figure 1:
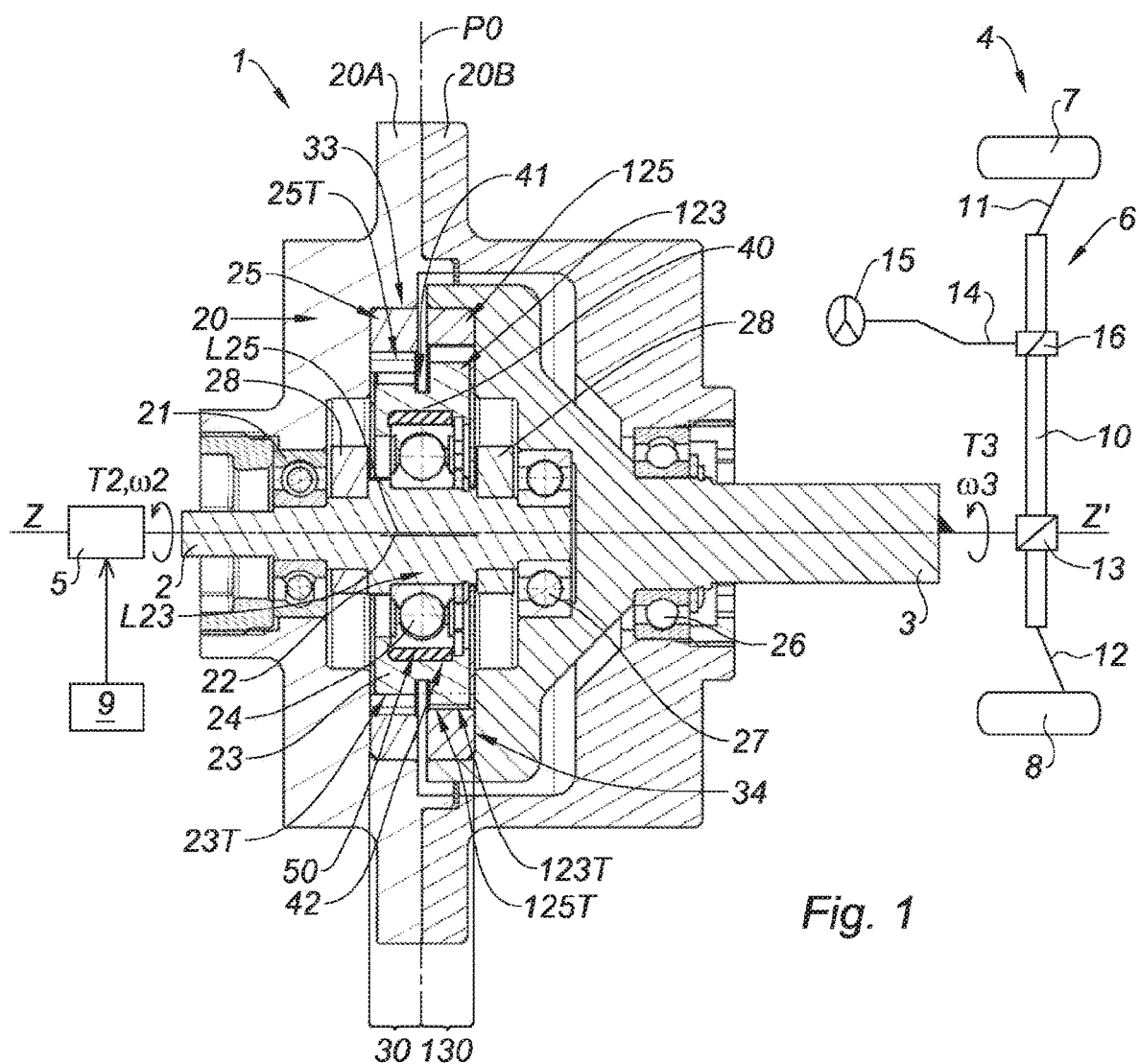
FIG. 1 illustrates, in a longitudinal sectional view along the main axis (ZZ'), a two-stage cycloidal reducer according to the invention, and a possible implantation of said reducer within a power steering system.

As such, the invention therefore relates, as illustrated in FIG. 1, to a power steering system 4, which comprises an assist motor 5, a steering mechanism 6 which allows modifying the steering angle of one or several steering member(s) 7, 8, such as one or several steered wheels 7, 8, said power steering system 4 including a cycloidal reducer 1 according to any one of the variants of the invention in order to provide a mechanical transmission between said assist motor 5, herein connected to the input shaft 2, and the steering mechanism 6, herein connected to the output shaft 3.

The assist motor 5 is preferably a bi-directional rotation electric motor, which is electronically controlled, according to predetermined assist laws, by an embedded calculator 9 on the vehicle.

In a manner known per se, the steering mechanism 6 may include a rack 10, which is mounted in translation in a steering casing fastened to the chassis of the vehicle, and which is connected to the steered wheels 7, 8 by steering tie rods 11, 12.

The output shaft 3 of the reducer 1 may then advantageously be connected to a first drive pinion 13 which meshes with said rack 10.

Preferably, the steering mechanism 6 also comprises a steering column 14 which carries a steering wheel 15 on which the driver acts to select the steering angle, and therefore the heading of the vehicle.

According to a preferred variant, the steering mechanism 6 is a «double pinion» mechanism, within which the steering column 14 meshes with the rack 10 by means of a second drive pinion 16, distinct and remote from the first drive pinion 13, as illustrated in FIG. 1.

It should be noted that the description provided preferably with reference to FIG. 1, and more particularly the use configuration of the reducer 1 within a power steering system 4, remains of course applicable mutatis mutandis to all variants of reducers 1 in accordance with the invention.

According to the invention, and as illustrated in FIG. 1, the cycloidal reducer 1 comprises an input shaft 2 which is mounted in rotation in a reducer casing 20 according to an axis called «main axis» (ZZ').

The input shaft 2 is to this end carried, and guided in rotation, by at least one input bearing 21, such as a ball bearing, housed in the reducer casing 20.

The reducer 1 also comprises an eccentric member 22, such as a cam, which is carried by the input shaft 2 and driven in rotation by said input shaft 2.

Figure 4:
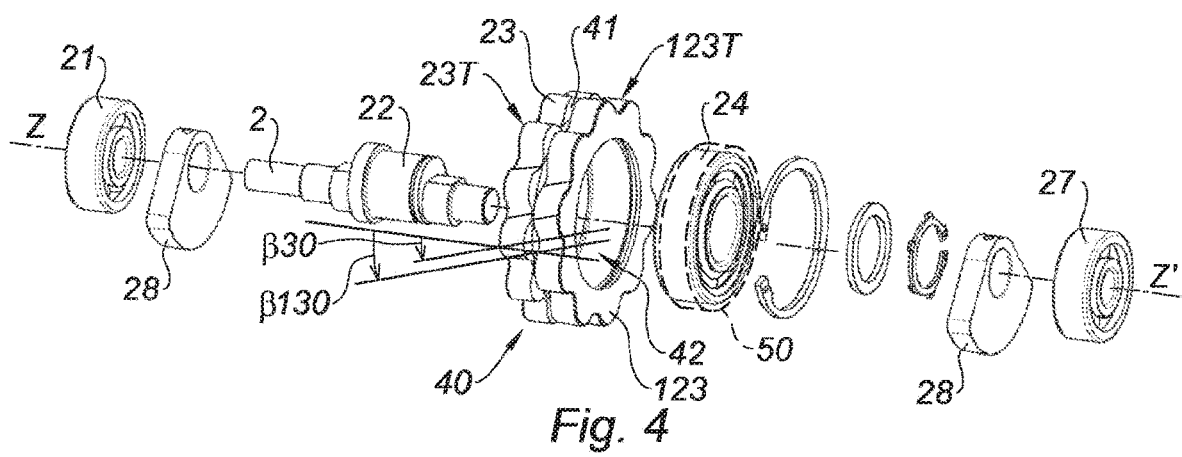
FIG. 4 illustrates, in an exploded perspective view, the detail of the cycloidal reduction stages of the reducer of FIGS. 1 to 3.

The eccentric member 22 may be formed by a cam-like separate part which is attached and fastened on the input shaft 2, or else preferably, and as illustrated in FIGS. 1 and 4, said eccentric member 22 may be formed integrally with the input shaft 2.

The reducer 1 further comprises at least one cycloidal disk 23 which is mounted in rotation on the eccentric member 22, by means of an eccentric bearing 24, such as a ball bearing, said cycloidal disk 23 being provided, herein on its radially outer perimeter, with a cycloidal toothing 23T.

The central axis of said cycloidal disk 23 will be noted L23.

Said central axis L23 is preferably parallel to the main axis (ZZ').

The cycloidal toothing 23T has, as its name suggests, substantially or even exactly a cycloid profile, said cycloid corresponding mathematically to the trajectory followed by a fictive point located on a fictive generating circle which rolls without sliding on the radially outer perimeter of a base circle centered on the central axis L23, said base circle herein corresponding to the toothing base circle of the cycloidal disk 23.

In this case, the lobes forming the toothing 23T of the disk 23 thus protrude radially in a centrifugal direction relative to the central axis L23 and relative to the toothing base circle of the disk 23.

The reducer 1 also comprises at least one rim 25 which is provided with a receiving toothing 25T on which the cycloidal toothing 23T of the cycloidal disk 23 meshes.

The receiving toothing 25T is also advantageously cycloidal, with a shape matching with the toothing 23T of the disk 23, and has the same (gear) module as the toothing 23T of the disk 23, so as to enable meshing.

Said receiving toothing 25 is generated on the radially inner perimeter of the rim 25, protruding in the radial centripetal direction towards the central axis L25 of the rim.

The central axis L25 of the rim 25 is preferably coincident with the main axis (ZZ'), such that the rim 25 is preferably coaxial to the input shaft 2.

Of course, the parameters used to define, in the form of parameterized curves, the cycloidal profiles of the toothings 23T, 25T according to the invention, such as the diameter of the pitch circle, the eccentricity, or the diameter of the toothing base circle of the rim may be freely adjusted so as to adapt said toothing profiles, relative to a rigorously cycloidal theoretical profile, for example, in order to minimize the stresses exerted on the teeth and to optimize the (theoretical) radial clearance supposed to enable both an easy assembly of the cycloidal gear and a smooth meshing.

In order to provide the necessary bearings for the movement transmission between the input shaft 2 and the cycloidal disk 23, the rim 25 is fastened in the reducer casing 20, for example by fastening screws, so as to be blocked at least in rotation about the main axis (ZZ'), and preferably so as to be fully secured to the reducer casing 20 (all degrees of freedom between the rim 25 and the reducer casing 20, in rotation and in translation, then being deleted).

Thus, the rotation ω2 of the input shaft 2 causes a rotation of the disk 23, about its central axis L23 (which coincides at all time with the axis of the eccentric member 22), under the combined action of the movement of the eccentric member 22, actuated by the rotation of the input shaft 2, and the cooperation between the cycloidal teeth 23T of said disk 23 and the conjugate receiving cycloidal toothing 25T of the rim 25, which causes and guides a rolling without sliding (or almost without sliding) of the cycloidal disk 23 on the rim 25.

The reducer 1 finally comprises an output shaft 3, distinct from the input shaft 2, and which is arranged so as to be driven in rotation by the cycloidal disk 23.

Figure 2:
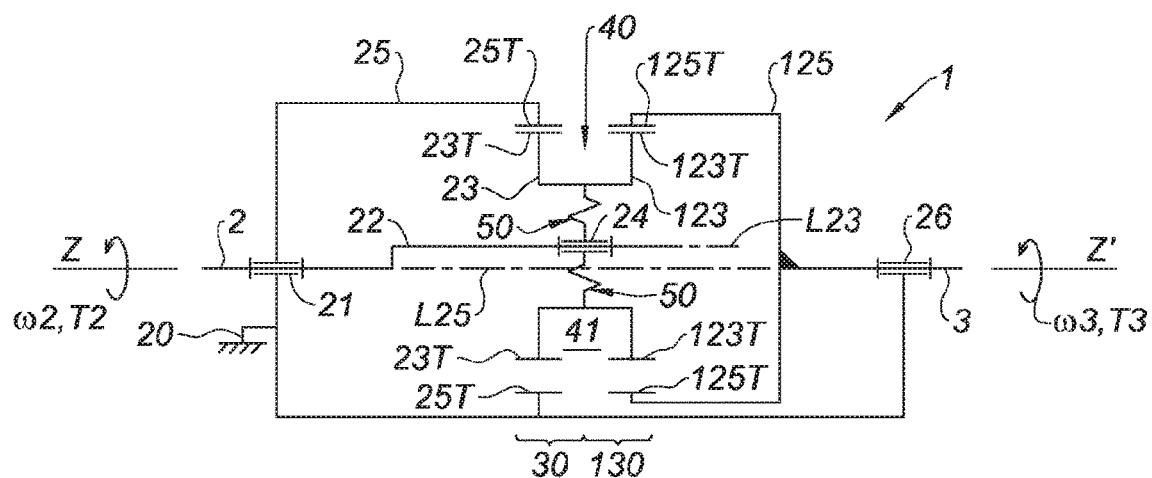
FIG. 2 illustrates, in the form of a kinematic diagram, the reducer of FIG. 1.

Although it is not excluded that the output shaft 3 is inclined relative to the input shaft 2, or even perpendicular thereto, and thus forms an angled transmission, the output shaft 3 is preferably parallel to, and more particularly coaxial with, the input shaft 2, as shown in FIGS. 1 and 2.

The output shaft 3 will advantageously be supported and guided in rotation by at least one output bearing 26, such as a ball bearing, housed in the reducer casing 20.

Furthermore, preferably, the input shaft 2 will be articulated in pivot connection, or in ball joint connection, with the output shaft 3, by means of a connecting bearing 27, such as a ball bearing, herein housed in the central hub of the output shaft 3, and coaxial with the input bearing 21, as illustrated in FIG. 1.

Moreover, as is well shown in FIG. 4, the input shaft 2 may comprise one or more flyweights 28 arranged to compensate for the mass imbalance caused by the eccentric member 22 and by the radial travel of the cycloidal disk 23 which is induced by the rotation of said eccentric member 22.

Thanks to these flyweights 28, it will be avoided to generate vibrations or cause a premature wearing of the reducer 1, and more particularly bearings 21, 24, 26, 27.

Figure 3:
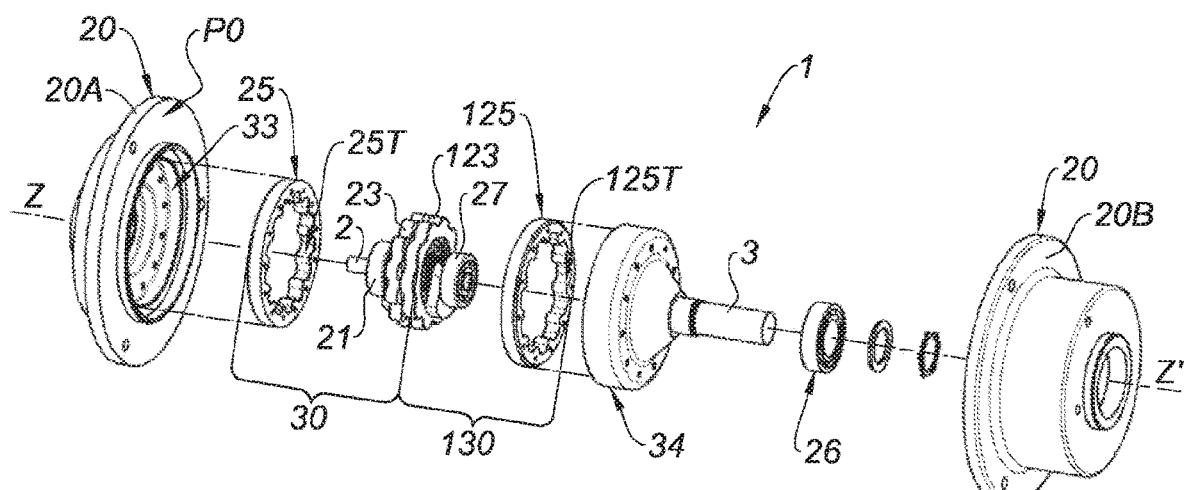
FIG. 3 illustrates, in an exploded perspective view, the reducer of FIGS. 1 and 2.

In order to facilitate the mounting of the reducer 1, the reducer casing 20 will be preferably subdivided, along a joint plane P0 transverse to the main axis (ZZ'), into at least one first (upstream) casing portion 20A, herein carrying the input bearing 21 and the input shaft 2, and a second (downstream) casing portion 20B carrying the output bearing 26 and the output shaft 3, as shown in FIGS. 1 and 3.

According to the invention, and as shown in FIGS. 1, 2, 6, 8, 11 to 18 and 21 to 24, the reducer comprises a suspension device 50 which is arranged to elastically bias the cycloidal toothing 23T from the cycloidal disk 23 and the receiving toothing 25T of the rim 25 against each other, so as to provide an automatic adjustment of the backlash between said cycloidal disk 23 and said rim 25 according to at least one component radial to the main axis (ZZ').

The term «radial» means a direction or a dimension considered perpendicular to the considered axis, herein more preferably perpendicular to the main axis (ZZ'), whereas the term «axial» means a direction or a dimension considered parallel to said considered axis, and therefore in particular parallel to the main axis (ZZ'), or even coincident with said considered axis.

Advantageously, the suspension device 50 elastically and permanently presses, by its elastic deformation, and at least according to a component radial to the main axis (ZZ') (and therefore according to at least one component radial to the respective central axes L23, L25 of the disk 23 and the rim 25), the cycloidal toothing 23T of the disk 23 against the cycloidal toothing 25T of the rim 25, and conversely, which allows permanently providing a contact between the two toothings 23T, 25T, in the meshing area where said toothings 23T, 25T mesh with each other.

The reducer 1 consequently has a smooth operation, without jerks or shocks, and this in particular during reversals of its direction of rotation.

In the particular case of an application to a power steering device 4, the driving comfort is thus considerably improved.

Furthermore, as indicated above, the suspension device 50 advantageously allows creating, during the operation of assembling the reducer, and by radial compression of said suspension device 50, a proper assembly radial clearance between the disk 23 and the rim 25, a radial clearance which is necessary (and sufficient) to be able to insert axially, substantially by translation along the main axis (ZZ'), the input shaft 2 and the disk 23 through the rim 25 (previously) fastened to the reducer casing 20, without damaging the disk and the rim, and without wedging the disk 23 in the rim 25, and regardless of the manufacturing tolerances of the disk 23 and the rim 25, and more particularly regardless of the manufacturing (shaping) tolerances of the toothings 23T, 25T.

The presence of a suspension member 50 according to the invention allowing accommodating said manufacturing tolerances and provisionally creating, despite these tolerances, the necessary backlash, the mounting of the reducer 1 is therefore greatly facilitated.

Advantageously, the elastic character of the suspension device 50 then allows automatically compensating for the backlash and automatically adjusting the pressure of a toothing 23T on the other 25T, without the need for a binding setting during the assembly.

It should be noted moreover that, preferably, the suspension device 50 is arranged so as to act collectively on several teeth, and preferably on all teeth 23T of the disk 23, respectively the teeth 25T of the rim 25, and not only individually on one or several distinct tooth(teeth).

In other words, the elastic deformation of the suspension device 50 preferably allows securely, simultaneously, displacing several teeth 23T of the disk, and preferably all teeth 23T of the disk 23, relative to the teeth 25T of the rim (or vice versa), according to the same overall movement, typically by individually displacing said disk 23 in its entirety, and more particularly by individually displacing said disk 23 in its entirety according to the same overall radial movement.

Thus, the same centralized and compact suspension device 50 allows advantageously adjusting the backlash regardless of the engaged teeth 23T, 25T, which allows simplifying and lightening the reducer 1.

It should be also noted that, in absolute terms, the suspension device 50, responsible for biasing the toothing 23T of the disk and the toothing 25T of the rim against each other, may be arranged in several configurations.

According to a first configuration, called «suspended movable disk configuration», the suspension device 50 is configured to be able to elastically displace, at least according to a radial component, the toothing 23T of the disk, and more generally the disk 23 as a whole, relative to the rim 25, the input shaft 2, and the reducer casing 20, that is to say so as to be able to radially displace the central axis L23 of the disk relative to the axis of the eccentric member 22, so as to dynamically press, in a centrifugal radial biasing (and elastic stress) direction, the (radially outer) toothing 23T of the disk towards and against the (radially inner) toothing 25T of the rim.

The suspension device 50 then tends to expel the disk 23 radially outward, so as to radially and elastically deport said disk 23 towards the rim 25, in the angular sector covered by the meshing area, and thus support the toothing 23T of the disk 23 against that 25T of the rim 25.

Conversely, according to a second configuration, called «suspended movable rim configuration», the suspension device 50 could be configured so as to be able to elastically displace, at least according to a radial component, the toothing 25T of the rim 25, and more generally the rim 25 as a whole, relative to the disk 23, the input shaft 2, and the reducer casing 20, that is to say so as to be able to radially displace the central axis L25 of the rim relative to the main axis (ZZ'), so as to dynamically press, in a centripetal radial biasing (and elastic stress) direction, the (radially inner) toothing 25T of the rim 25 towards and against the (radially outer) toothing 23T of the disk 23.

Alternatively, it could even be considered to combine these two configurations within the same reducer 1, the disk 23 and the rim 25 being each suspended against each other by a suspension device 50.

Nonetheless, it should be noted that the rim 25 should be able to oppose a resisting torque to the disk 23, so as to cause the cycloidal rotation of the disk 23 and the transmission of a torque T3 to the output shaft 3.

When opting for the suspended movable disk configuration, the suspension device 50 should consequently be interposed radially between the rim 25 and the support receiving said rim 25 (herein the upstream portion 20A of the reducer casing 20), and provide a connection of said rim 25 with its support which allows a radial mobility of said rim 25 relative to said support, under the centripetal biasing action exerted by the suspension device 50, while selectively blocking the rotation of said rim 25 about its axis L25 relative to said support.

This might possibly slightly complicate the machining of the support (reducer casing 20) or the manufacture of the reducer 1, or even restrict the angular range of radial directions actually available for the backlash adjustment, about the main axis (ZZ').

This is why, preferably, the suspended movable disk 23 configuration will be privileged, whereas the rim 25 will be securely fastened to its support, without the possibility of elastic movement, in particular without the possibility of radial movement, relative to said support.

To this end, and as shown in FIGS. 1, 2, 6, 8, 11 to 18 and 21 to 24, the suspension device 50 is preferably carried by the input shaft 2, and interposed radially between said input shaft 2 and the cycloidal disk 23.

Indeed, such an arrangement allows simplifying the arrangement of the reducer 1, and consequently the assembly operations, and improving the compactness and the cost price of the reducer, while providing an effective backlash adjustment, by means of a suspension device 50 which tends to elastically bias the disk 23T in a centrifugal manner, from the main axis (ZZ') of the input shaft, and more particularly from the central axis of the eccentric member 22, towards the outside and the rim 25.

Preferably, the suspension device 50 may more particularly be (radially) interposed between the eccentric member 22 and the cycloidal disk 23, as illustrated in FIGS. 1, 2, 6, 11 to 18 and 21 to 24.

It will thus be possible to obtain a simple, compact and robust mounting.

Figure 6:
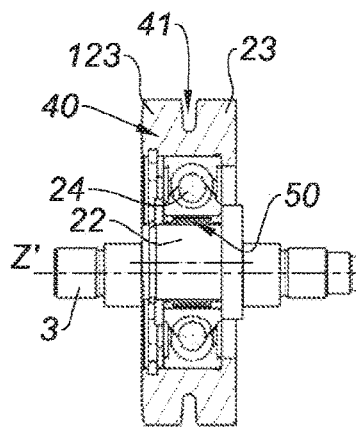
FIGS. 6 and 7 illustrate, in a sectional view along the main axis (ZZ'), and in a front projection view, the detail of a first variant of a reducer according to the invention, with a suspension device interposed between the eccentric member and the eccentric bearing supporting the cycloidal disk.
Figure 7:
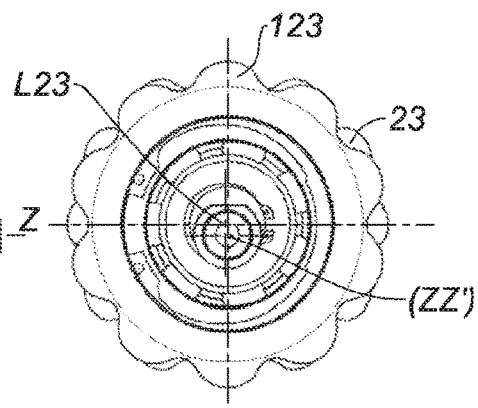
Figure 8:
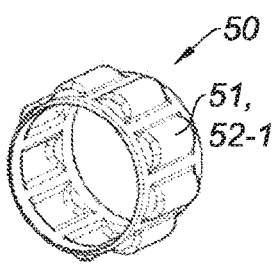
FIG. 8 illustrates, in a perspective view, the suspension device used within the first variant of a reducer of FIGS. 6 and 7.

As such, it might be considered, as illustrated in FIGS. 6 to 8, to radially place the suspension device 50 between the eccentric member 22 and the eccentric bearing 24 supporting the disk 23, and more particularly against the radially outer surface of said eccentric member 22, on the one hand, and against the radially inner surface of the radially inner ring of said eccentric bearing 24, on the other hand.

Nonetheless, in a particularly preferred manner, and as illustrated in FIGS. 11 to 18 and 21 to 24, the cycloidal disk 23 being mounted in rotation on the eccentric member 22 by means of an eccentric bearing 24 as described above, the suspension device 50 may be interposed radially between said eccentric bearing 24 and the cycloidal disk 23.

More particularly, the suspension device 50 may, to this end, bear radially outwards on the outer ring of said eccentric bearing 24, and bear radially inwards against the hub of the disk 23, whose radially inner wall herein delimits a central housing 42.

In particular, such an arrangement will allow improving the stability of mounting as well as the quality of the backlash adjustment and the elastic deformation amplitude available to carry out said backlash adjustment.

Thus, ultimately, it is conceivable that the suspension device 50 is placed radially set back from the eccentric bearing 24 (between the input shaft 2, and more particularly the eccentric member 22, and the inner ring of the bearing 24), or on the contrary radially beyond the eccentric bearing 24 (between the outer ring of said bearing 24 and the disk 23).

Preferably, and as shown in particular in FIGS. 6, 8, 11 to 18 and 21 to 24, the suspension device 50 comprises at least one annular elastic member 51, 151 which provides a multidirectional radial suspension about the main axis (ZZ').

Advantageously, an annular elastic member, which covers at least 270 degrees around the main axis (ZZ'), and preferably which forms a 360-degree full contour around the main axis (ZZ'), and which is elastically compressible (then expandable) radially, that is to say in the direction of its radial thickness allows exerting a backlash adjustment force in any of the possible azimuthal directions around the main axis (ZZ').

Thus, although the meshing area between the disk 23 and the rim 25 is rotatably displaced about the main axis (ZZ'), due to the cycloidal nature of the meshing, the backlash is permanently adjusted, the disk 23 being centrifugally pushed back towards the rim 25 in the angular sector covered by said meshing area, regardless of the azimuthal position of said meshing area.

Such an arrangement therefore allows, by means of an elastic member 51, 151 which is compact, inexpensive, of simple shape, robust, and easy to mount about the main axis (ZZ'), achieving a particularly effective backlash adjustment in all directions around said main axis (ZZ').

The elastic member 51, 151 may take on any appropriate shape, including in particular: a corrugated leaf spring 52-1 (FIGS. 8, 14, 16, 18, 22, 24), such as for example a Rencol® tolerance ring or Smalley® expander, a cambered leaf spring 52-2, 152-2, in particular with C-shaped curved leaf (FIGS. 12, 24), a Balseal® type toric spiral spring 152-3 (FIG. 22), or else an elastomeric annulus such as an O-ring 53-1 (FIGS. 12, 14, 18, 22 and 24), or a four-lobed joint 53-2 (FIG. 16).

Of course, it is possible to freely choose the shape of the elastic member 51, 151 among the examples listed above (or even other shapes), any aforementioned elastic member 51, 151 being able in particular to be replaced by another equivalent elastic member, with a different shape but with comparable elastic properties.

Similarly, although it is possible to consider a suspension device 50 constituted by a single elastic member 51, as illustrated in FIGS. 6 and 8, it is preferred to use, in particular in order to improve the stability of the suspension, or else to improve the progressiveness of the suspension and confer a damping effect to the suspension device 50, a combination of several distinct elastic members 51, 151, for example two elastic members (FIGS. 11 and 12) or three elastic members (FIGS. 13 to 18) axially stepped along the main axis (ZZ').

This plurality of elastic members 51, 151 may preferably act together against the same disk 23, or the same set 40 of secured disks 23, 123, as illustrated in FIGS. 11, 13, 15, 17.

Preferably, as illustrated in FIGS. 11 to 18 and 21 to 24, the suspension device 50 comprises at least one metallic elastic member 51, 151 forming a spring 52, 152, and at least one elastic member 51 made of elastomeric material forming a damper 53.

Advantageously, the combination, on the one hand, of a metallic spring 52, 152, having a high radial stiffness, generating a powerful biasing force allowing pressing the disk 23 against the rim 25, with on the other hand, a more flexible damper 53 capable of effectively absorbing the shocks and the vibrations, allows creating a damped suspension effect, of a spring-damper type, particularly effective and comfortable.

Preferably, the spring 52 and the damper 53 will both be annular, engaged around the main axis (ZZ'), and preferentially interposed radially between the input shaft 2 and the disk 23, and preferably axially stepped, as described above, so as to exert in parallel their action on the disk 23.

Of course, any material that is both sufficiently rigid and elastic, and for example having a Young's modulus equal to or greater than 0.1 GPa, may be used to manufacture the spring 52.

Preferably, the material used to form the damper will have, in turn, a Shore hardness A comprised between 50 and 90.

Moreover, and in particular, regardless of the number, the arrangement and the shape of the elastic member(s) 51, 151 whether being annular or not, smooth or corrugated, etc., the suspension device 50 preferably has a useful elastic radial stroke which is equal to or larger than 0.05 mm, and preferably comprised between 0.1 and 0.3 mm.

Thus, said radial stroke, which corresponds in practice to the amplitude of the radial elastic travel that the suspension device 50 can confer, by its elastic deformation, to the disk 23 relative to the rim 25, and more particularly relative to the central axis of said suspension device 50 (herein coincident with the central axis of the eccentric member 22), will advantageously represent a distance sufficient to cover the predictable assembly tolerances, the predictable backlash range to be compensated, and the progressive wearing of the reducer 1.

Such a radial stroke corresponds to an amplitude of the elastic deformation range (herein the elastic deformation in radial compression) which is admissible by the suspension device 50, and more particularly which is permissible by its constituent elastic member(s) 51, 151.

Typically, it will be possible to set the limit of said deformation range as corresponding to the elastic limit (Re) of the constituent material of the elastic member 51, 151, or for example to the conventional limit with a plastic deformation at 0.2% (Rp0.2) of said elastic member 51, 151.

According to a preferred feature which may constitute an invention on its own, independently of the presence or absence of a suspension device 50 according to the invention, and as shown FIGS. 3 and 4, the cycloidal toothing 23T of the disk 23, as well as the corresponding receiving toothing 25T of the rim 25, are helical.

In other words, the lobes forming the teeth 23T, 25T of the cycloidal disk 23 and the rim 25 are generated geometrically from a base cross-section (section considered in a section plane perpendicular to the central axis L23, L25), which herein has a cycloid profile, and which covers a median generating line which winds helically around the central axis L23, L25.

The teeth 23T, 25T are thus inclined, in side projection, at a predetermined helix angle $\beta$30 with respect to the central axis L23, L25.

Advantageously, the use of a helical toothing 23T, 25T enables a progressive and very spatially extended meshing, with a high gear contact ratio, that is to say with an average number of teeth simultaneously engaged during the meshing which is high, which promotes the smoothness of the operation of the reducer 1 and removes the jerks, shocks, and operating noises.

Furthermore, the combination of a helical toothing 23T, 25T with a suspension device 50 allows improving further the smoothness and the comfort of the meshing.

Moreover, the presence of the suspension device 50 allows creating an assembly backlash, and therefore creating a radial approach and fitting component which allows moving the disk 23 radially away from or towards the rim 25, depending on needs, within the rim 25, during the assembly.

The presence of the suspension device 50 thus guarantees the ease of assembly of the disk 23 in the rim 25, although the helical teeth are more sensitive to manufacturing tolerances, and thereby potentially more difficult to nest without wedging into each other than straight teeth.

Figure 5:
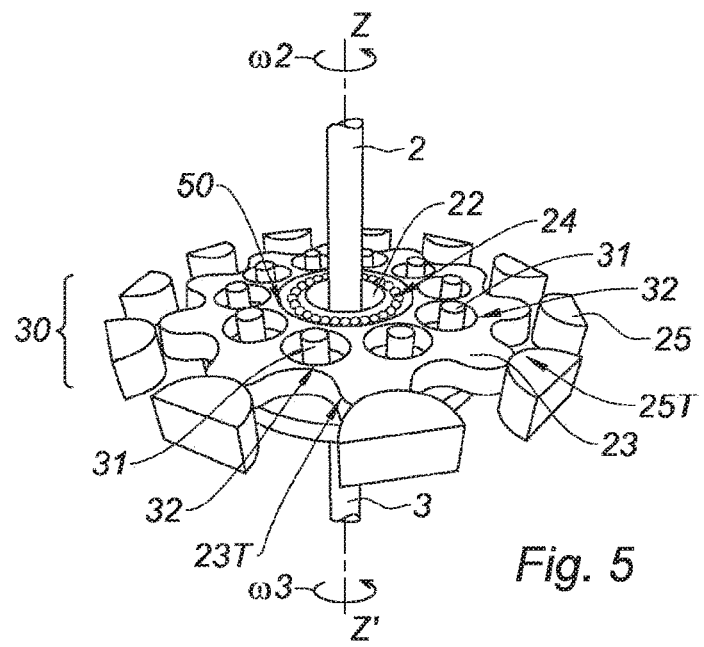
FIG. 5 illustrates, in a schematic perspective view, the operating principle of a cycloidal reducer comprising a single reduction stage.

According to an arrangement possibility corresponding to the variant illustrated in FIG. 5, the reducer 1 may form a reducer with a single cycloidal reduction stage 30, comprising a single cycloidal assembly within which a cycloidal disk 23 (possibly divided into several cycloidal disks stacked axially against each other and fastened to each other) meshes on one and the same rim 25 (where appropriate common to the stack of disks 23).

According to such a single-stage arrangement, the movement transmission between the cycloidal disk 23 (or the stack of cycloidal disks 23) and the output shaft 3 may be obtained, in a manner known per se, by providing on the output shaft 3 a plurality of rectilinear coupling fingers 31 parallel to the main axis (ZZ') and disposed in a circle around the main axis (ZZ'), at regular interval, each of said coupling fingers 31 cooperating with a circular coupling orifice 32 bored into the cycloidal disk 23.

The coupling orifices 32, distributed in a circle and at a regular interval around the central axis L23 of the cycloidal disk 23, have a diameter larger than that of the coupling fingers 31, so as to be able to absorb the radial travel component of the disk 23 relative to the output shaft 3 (that is to say, the movement component perpendicular to the central axis (ZZ'), which is induced by the rotation of the eccentric member 22), while transmitting a rotation component $\omega$3.

Of course, alternatively, the coupling fingers 31 may be carried by the disk 23, and the coupling orifices 32 may be carried by the output shaft.

Nonetheless, according to another particularly preferred arrangement possibility, corresponding to the variants illustrated in FIGS. 1 to 4 and 6 to 24, the cycloidal reducer 1 includes two reduction stages 30, 130.

Advantageously, the use of a double reduction stage allows obtaining a very high reduction ratio R=$\omega$2/$\omega$3, typically equal to or greater than 40, 50 or even 100, while maintaining a good compactness, and in particular a small axial overall dimension along the main axis (ZZ'), of the reducer 1.

In other words, the multiplication of the cycloidal reduction stages allows increasing the «density» of the reducer 1, by considerably increasing the reduction ratio while maintaining a light and compact reducer.

Such a double-stage reducer 1 firstly includes a first reduction stage 30, which comprises the eccentric member 22, a first cycloidal disk 23, called «input disk», mounted in rotation on said eccentric member 22 (itself driven in rotation by the input shaft 2) and which is provided with a first cycloidal toothing 23T, as well as a first rim 25, called «input rim», which is secured to the reducer casing 20 and which is provided with a first cycloidal receiving toothing 25T on which the first cycloidal toothing 23T of the input disk 23 meshes, as described above.

The input rim 25 may be fastened, for example by screwing, in the reducer casing 20, and more particularly in a counterbore 33 of the upstream portion 20A thereof, which facilitates in particular the centering and the radial holding of said input rim 25.

Said reducer 1 also includes a second reduction stage 130, which comprises a second cycloidal disk 123, called «output disk», which is secured in rotation to the input disk 23, and preferably formed integrally with said input disk 2, and which is provided with a second cycloidal toothing 123T, said second reduction stage 130 also comprising a second rim 125, called the «output rim» which is distinct from the input rim 25 (and axially distant from said input rim 25), which is secured in rotation to the output shaft 3 (so as to be able to drive in rotation said output shaft 3, and/or be driven in rotation by the latter), and which is provided with a second cycloidal receiving toothing 125T on which the second cycloidal toothing 123T of the output disk 123 meshes.

The term «secured in rotation» means that the output disk 123 is coupled to the input disk 23, and more preferably fastened to said input disk 23 or formed integrally with the latter, such that the rotation of the input disk 23, and more generally the movement of the input disk 23 (relative to the reducer casing 20), is transmitted to the output disk 123, preferably identically, in the same overall rotary movement.

For simple convenience of notation, the elements of the second reduction stage 130 may carry a reference identical to that of similar elements of the first reduction stage 30, but incremented by a value 100.

Moreover, the number Z25, Z125 of teeth of a rim 25, 125 will be greater, preferably by one unit (by one tooth), than the number of teeth Z23, Z123 of the corresponding disk 23, 123.

This will result in Z25=Z23+1 and Z125=Z123+1.

Within the reducer 1 with a double reduction stage, the reduction ratio R=$\omega$2/$\omega$3 will be given by the formula:

$$1/R=1-(Z25 \times Z123)/(Z23 \times Z125).$$

The number of teeth of the different disks 23, 123 and rims 25, 125 will advantageously be selected depending on the desired reduction ratio.

As example, by selecting Z23=25 and Z123=18, and consequently Z25=26 and Z125=19, a reduction ratio R=67.9 is substantially obtained.

The output rim 125, movable in rotation about the main axis (ZZ') relative to the reducer casing 20, may be attached and fastened, for example by screwing, at an end of the output shaft 3, which may form to this end a bearing flange 34, preferably shouldered to facilitate the centering of said output rim 125, as illustrated in FIGS. 1 and 3.

Preferably, and as illustrated in FIGS. 21 and 23, the first reduction stage 30 comprises a first suspension device 50 which provides at least one radial elastic adjustment of the backlash between the input disk 23 and the input rim 25, whereas the second reduction stage 130 comprises a second suspension device 150, distinct from the first suspension device 50, and which provides at least one radial elastic adjustment of the backlash between the output disk 123 and the output rim 125.

Advantageously, the invention therefore proposes dissociating the (radial) suspension in order to create a suspension 50, 150 specific to each reduction stage 30, 130, and independent (at least partially, or even totally) of the suspension of the other reduction stage 130, 30, which thus provides a particularly effective overall suspension, by optimizing the backlash adjustment at the level of each stage.

Thus, in particular, the backlash adjustment azimuthal direction between the input disk 23 and the input rim 25 within the first reduction stage 30, that is to say the azimuthal direction in which the radial thrust of the first suspension device 50 is (mainly or exclusively) exerted at a considered moment, may be different from (secant to) the backlash adjustment azimuthal direction between the output disk 123 and the output rim 125, within the second reduction stage 130, that is to say different from (and secant to) the azimuthal direction in which the radial thrust of the second suspension device 150 is (mainly or exclusively) exerted at the same considered moment.

The same will apply to the (absolute) radial amplitude of the backlash adjustment at a considered moment, and more generally to the (maximum) useful elastic radial stroke offered respectively by the first suspension device 50 and by the second suspension device 150, which may be different, and in particular larger, within the second reduction stage 130 than that within the first reduction stage 30 (or vice versa).

According to a preferred embodiment, it is possible to dissociate the mobility in translation, transversely to the main axis (ZZ'), of the input disk 23 from the mobility in translation, transversely to the main axis (ZZ'), of the output disk 123, so as to be able to use, for each reduction stage 30, 130, an independent suspension device 50, 150, in a suspended movable disk configuration, as illustrated in FIGS. 19 to 24.

Such a suspended movable disk arrangement will allow gaining in compactness and simplifying the suspension devices, for the reasons already mentioned above.

To this end, the input disk 23 may preferably be coupled to the output disk 123 by a coupling joint 55, of the such as an Oldham coupling 55, such that the input disk 23 and the output disk 123 are secured in rotation about the main axis (ZZ'), but have a freedom in translation relative each other in (at least) two directions which are radial, secant and more preferably perpendicular to each other.

Said radial directions are noted respectively X and Y in FIGS. 19 and 20, and herein form together with the main axis (ZZ') a direct trihedron.

This combination of degrees of freedom allows, by composition, any translation of the input disk 23 relative to the output disk 123 in a plane normal to the axis of rotation (ZZ'), and more generally in a plane normal to the central axis L23 of the considered disk 23, the movements in radial translation of the input disk 23 relative to the output disk 123 (and vice versa) being absorbed by the coupling joint 55.

Preferably, within the coupling joint 55, and more particularly within the Oldham coupling 55, the input 23 and output 123 disks are guided in radial translation, for example by a system of slots 57, 59 and tabs 58, 60, respectively in the first radial direction X and the second radial direction Y, so as to advantageously provide a rigid, accurate and robust coupling of the disks 23, 123 in rotation, while maintaining a free radial travel of each disk 23, 123 relative to the other disk 123, 23.

Of course, any coupling joint 55 equivalent to an Oldham coupling, that is to say having the aforementioned kinematic features of coupling in rotation, on the one hand, and of decoupling in transverse translation, on the other hand, typical of an Oldham coupling, may be used to couple the input disk 23 to the output disk 123.

Advantageously, the first suspension device 50 may then be interposed radially between the input shaft 2 and the input disk 23, whereas the second suspension device 150 may be interposed radially between the input shaft 2 (the same input shaft 2, and more particularly the same eccentric member 22, then shared by the two disks 23, 123) and the output disk 123, so as to dissociate, on either side of the coupling joint (Oldham coupling) 55, the radial elastic suspension action of the first reduction stage (input stage) 30 of the radial elastic suspension action of the second reduction stage (output stage) 130.

Preferably, and as illustrated in FIGS. 19, 20, 21 and 23, the coupling joint 55, and more particularly the Oldham coupling 55, is formed by a coupling washer 56 which is interposed axially between the input disk 23 and the output disk 123, around the main axis (ZZ').

More particularly, the input disk 23 and the output disk 123 being preferably both mounted in rotation on the eccentric member 22 by means of the same common eccentric bearing 24, the coupling washer 56 forming the Oldham coupling 55 will preferably be interposed axially between the input disk 23 and the output disk 123 around said eccentric bearing 24, as illustrated in FIGS. 21 and 23.

Said coupling washer 56 will preferably cooperate with the input disk 23 by at least one first set of slots 57 and tabs 58 and respectively with the output disk 123 by a second set of slots 59 and tabs 60, said second set 59, 60 of slots and tabs intersecting orthogonally with respect to the first set 57, 58, so as to define two degrees of freedom X, Y in radial translation.

More particularly, as illustrated in FIGS. 19 and 20, the first set 57, 58 defines the first radial direction X, and the second set 58, 59 the second radial direction Y.

Preferably, the coupling washer 56 has a substantially constant thickness and is brought, outside the guide areas imposed by the cooperation of the slots 57, 59 and tabs 58, 60, into a sliding bearing of the plane-on-plane type, by each of its planar faces (substantially normal to the main axis (ZZ')), against the corresponding planar face (itself preferably normal to the main axis (ZZ')) of the input disk 23, respectively against the corresponding planar face of the output disk 123 (preferably also normal to the main axis (ZZ')).

The use of such a coupling washer 56, also forming a friction washer, allows making a particularly simple and compact Oldham coupling 55.

Of course, the constituent material of the coupling washer 56 will be selected so as to have a low coefficient of friction in contact with the disks 23, 123, if possible so as to be self-lubricated, and to be resistant to abrasion.

As example, it will be possible to choose a PTFE, a PolyAmide, or a PolyButhylene terephthalate, or any other injectable thermoplastic polymer, preferably including «tribological» charges promoting the sliding (for example PTFE, graphite or molybdenum disulfide), or else a metallic material, such as steel or aluminum, preferably coated with a «tribological» surface treatment improving the sliding on and against the disks 23, 123.

Moreover, it should be noted that, advantageously, the axial thickness of the coupling washer 56 allows forming an axial separation between the two reduction stages 30, 130, as shown in FIGS. 21 and 23, and thus allows preventing the input disk 23 from interfering or meshing with the output rim 125, and, conversely, the output disk 123 from interfering or meshing with the input rim 25.

Preferably, the first suspension device 50 may comprise at least one first elastic member 51, preferably annular, interposed radially between the eccentric bearing 24 and the input disk 23, and located axially on a first side with respect to the coupling washer 56, whereas the second suspension device 150 may comprise at least one second elastic member 151, preferably annular, interposed radially between the eccentric bearing 24 and the output disk 123, and located axially on a second side, opposite to the first side, with respect to the coupling washer 56, as shown in FIGS. 21 and 23.

Advantageously, the reducer 1 with a double reduction stage 30, 130 which may thus benefit from a common carrier structure (the input shaft 2 and the eccentric bearing 24), shared by the two stages 30, 130, but nevertheless with dissociated independent suspensions 50, 150, for each of said stages 30, 130.

As such, it should be noted that the first suspension device 50 may comprise a spring 52 of the same nature as the spring 152 of the second suspension device 150 (for example, in both cases, a corrugated leaf spring), or else, on the contrary, of a nature different from the spring 152 of the second suspension device, as is the case for example in FIG. 22, where the first spring 52 is formed by a corrugated leaf spring 52-1 whereas the second spring 152 is formed by a toric spiral spring 152-3, or else in FIG. 24, where the first spring 52 is formed by a corrugated leaf spring 52-3, whereas the second spring 152 is formed by a radial stack of two C-shaped leaf springs 152-2 leaning against each other.

It should also be noted that the reducer 1 may possibly comprise a damping member 53, such as possibly a unique O-ring, which is common to the two reduction stages 30, 130, and therefore shared by the two suspension devices 50, 150, as illustrated in FIGS. 21 to 24.

Said shared damping member 53 may then be advantageously placed at the same abscissa as the coupling washer 56, as shown in FIGS. 21 and 23, between the first spring 52, which serves to (exclusively) suspend the input disk 23, and the second spring 152, which serves to (exclusively) suspend the output disk 123.

Such a sharing of the damper 53, including a first half (herein considered according to its midplane, normal to the main axis (ZZ')) will act at the level of the first stage 30 and the opposite second half will act at the level of the second stage 130, will in particular allow improving the compactness, without compromising the independence of the suspension of the two stages 30, 130, which is provided by distinct springs 52, 152 axially distant from each other.

Moreover, when the reducer 1 comprises two reduction stages 30, 130, at least one of the two stages, and preferably each of the two stages, will preferably use a helical cycloidal toothing.

In other words, and in a particularly preferred manner, the cycloidal toothings 23T, 25T, 123T, 125T of the input disk 23 and the input rim 25 on the one hand, of the output disk 123 and the output rim 125, on the other hand, are helical, and have respectively as such a helix angle called «input helix angle» $\beta 30$ and a helix angle called «output helix angle» $\beta 30$, as shown in FIG. 4.

Said helix angles $\beta 30$, $\beta 130$ characterize the inclination of the teeth with respect to the respective central axis L23, L25 of their disk 23, 123 or their rim 25, 125, and more generally with respect to the main axis (ZZ') to which said central axes are preferably parallel.

Advantageously, the set of cycloidal reduction stages 30, 130 of the reducer 1 thus has a smooth and silent operation.

Preferably, and as shown in FIGS. 6 and 10, the input helix angle β30 and the output helix angle β130 are oriented in the same direction with respect to the main axis (ZZ'), such that the first reduction stage 30 and the second reduction stage 130 are arranged according to an arrangement with substantially parallel toothings 23T, 25T, respectively 123T, 125T.

More particularly, the helix angle of the input disk 23 (by convention +β30) bears the same sign as the helix angle of the output disk 123 (by convention +β130), that is to say, that it is inclined in the same direction with respect to the main axis (ZZ'), or even substantially parallel thereto (and therefore at the same time of the same sign and of the same value as) the helix angle of the output disk 123, whereas, respectively, the helix angle of the input rim 25 (by convention −β30 because it is of the same value as the helix angle of the input disk 23, but with an opposite sign for construction reasons) is of the same sign as the helix angle of the output rim 125 (by convention −β130), or even substantially parallel to said helix angle of the output rim 125.

Advantageously, unlike a herringbone arrangement, a (substantially) parallel arrangement of the toothings, that is to say an arrangement according to which the helix angle β30 of the first stage 30 and the helix angle β130 of the second stage 130 bear the same sign, that is to say have the same direction of inclination with respect to the main axis (ZZ'), allows supporting by the reducer 1 itself, the axial forces which are produced by the inclination of the helical toothings.

Thus, it is possible to limit, or even substantially cancel, the resultant of axial force, which is generated along the main axis (ZZ') because of the use of the helical teeth, which avoids supporting such an axial force component by bearings (rollings) external to the reducer 1.

The reducer 1 may thus advantageously be implanted within the power steering system 4 without the need for modifying or reinforcing the steering mechanism 6.

In absolute terms, it is possible to have strictly parallel helix angles between the first stage 30 and the second stage 30, that is to say that: β30=β130 (therefore +β30=+β130 and −β30=−β130).

Nonetheless, according to a preferred arrangement possibility, the (amplitude) value of the input helix angle β30 is different from the (amplitude) value of the output helix angle β130.

More particularly, these two helix angle values β30, β130 are preferably adjusted so as to obtain, in particular with regards to the number of teeth Z23, Z123 and the respective modulus m23, m123 of each cycloidal disk 23, 123, an optimized compensation of the axial forces.

Indeed, for a helix angle helical gear β, with a primitive radius r (with r=½*m*Z, where m is the modulus and Z the number of teeth), the generated axial force component Fa is: Fa=T*sin(β)/r=2*T*sin(β)/(m*Z), where T represents the transmitted torque.

By applying this formula to each reduction stage 30, 130, a relationship may be expressed between the input helix angle β30 and the output helix angle β130 which enables each stage 30, 130 to neutralize the axial force generated by the other stage 130, 30.

More particularly, the output helix angle β130 may be calculated as follows:

$$\sin\beta 130 = \sin\beta 30 * (m123 * Z123)/(m23 * Z23)$$

As example, an output disk 123 having a helix angle β130=25.33 deg, a modulus m123=4.5 mm and a number of teeth Z123=18, may compensate the axial forces generated by an input disk 23 having a helix angle β30 of 25.00 deg, a modulus m23=3.2 mm and a number of teeth Z23=25.

Moreover, most of the teeth (cycloidal lobes), and preferably all the teeth, which constitute the receiving toothing 25T, 125T of the rim(s) 25, 125 are preferably formed integrally with their respective rim 25, 125.

Such a monolithic arrangement of the toothings 25T, 125T will allow, in comparison with the old toothings made by a set of individual studs, increasing the robustness of the rims 25, 125 and, especially, improving the accuracy of the (helical) shaping of the teeth and the accuracy of the positioning of said teeth relative to each other, which will improve the quality of the meshing while allowing significantly reducing the manufacturing time necessary to assemble reducer 1.

The shaping of the toothings 25T, 125T, and more generally the rims, in the form of closed rings, which surround the central axis L25 of the rim, and therefore the main axis (ZZ'), continuously over 360 degrees, may be made for example by molding and/or shaping.

The material used to manufacture the rims 25, 125, and their respective toothings 25T, 125T, may be steel, possibly treated (for example by heat treatment) to increase its surface hardness and/or reduce its coefficient of friction relative to the cycloidal disk 23, 123.

It should be noted that it will preferably be the same for each cycloidal disk 23, 123, most and preferably all of whose teeth forming the toothing 23T, 123T will preferably be formed integrally, for example by molding and/or shaping, with the concerned disk 23, 123.

Advantageously, the fact of securely grouping together all the teeth 23T, 123T of a disk on said disk 23, 123, and/or respectively all the teeth 25T, 125T of a rim on said rim 25, 125, further allows the suspension device 50 to exert a collective backlash adjustment, by simultaneously acting on all of said teeth 23T, 123T, respectively 25T, 125T, simply because said suspension device 50 may confer the disk 23, respectively the crown 25, with an overall movement (and more particularly a radial component of an overall displacement).

Thus, the arrangement of the suspension device 50 may be simplified, and the defects inherent to the previously known backlash setting devices by individual pre-load, within which the backlash setting has been performed tooth by tooth, and which, besides the complexity of the setting, have presented a risk of excessive clamping, or on the contrary, of insufficient backlash adjustment, are eliminated.

Moreover, according to an implementation variant, the input disk 23 and the output disk 123 may be securely united to each other to form a disks subset 40, animated by the same overall movement (relative to the reducer casing 20), as is herein illustrated, without limitation, in FIGS. 1, 6, 11, 13, 15 and 17.

According to a possibility of this variant, the input disk 23 and the output disk 123 may be manufactured in the form of separate parts, and then be assembled to each other to securely form said subset, for example by fastening screws.

Nonetheless, according to another preferred possibility of this same variant, the input disk 23 and the output disk 123, with their respective toothings 23T, 123T, may be formed piece integrally with each other, so as to constitute a monolithic, unique subset 40, each disk 23, 123 of which preferably forms an axial end, as illustrated in FIG. 1.

In all cases, a groove 41 will be preferably provided, which will partially, axially separate the input disk 23 from the output disk 123, at least over a range of radii (with respect to the central axis L23 common to both disks) which covers the annular sector which corresponds to the height of the toothings 23T, 123T, as shown in FIGS. 1 and 4.

Said groove 41 materializes the axial separation between the two reduction stages 30, 130 and advantageously allows preventing the input disk 23 from interfering or meshing with the output rim 125, and, conversely, preventing the output disk 123 from interfering or meshing with the input rim 25.

Furthermore, where appropriate, such a groove 41 may form a room for a tool facilitating the shaping or the grinding of the toothings 23T, 123T of the disks 23, 123.

Preferably, the disks subset 40 will further comprise a tubular central housing 42 designed to receive, in a fitted mounting, the eccentric member 22 and the eccentric bearing 24, as well as, preferably, the suspension device 50 providing the suspension of said subset.

The disk(s) 23, 123, and therefore more generally the subset 40, may for example be formed of steel, which may preferably be treated (for example by heat treatment) to increase its surface hardness and/or reduce its coefficient of friction.

Of course, the invention also concerns, as such, the cycloidal «spare parts» allowing making either one of the reduction stages 30, 130.

In particular, the invention will concern, as such, a subset comprising an input shaft 2 carrying an eccentric member 22 on which, at least one cycloidal disk 23, 123 is mounted in rotation, and where appropriate two cycloidal disks 23, 123, possibly assembled by a coupling joint such as an Oldham coupling 55, as well as one, or even two, suspension device(s) 50, 150 providing a radial suspension of said disks 23, 123 relative to the eccentric member 22.

Similarly, the invention will cover, as such, a subset comprising a first cycloidal disk 23 cooperating with a second cycloidal disk 123 by a coupling joint such as an Oldham coupling 55, and more particularly via a coupling washer 56 with slots 57, 59 and tabs 58, 60, interposed axially between the two disks 23, 123, preferably in direct contact with the latter.

Of course, the invention is in no way limited to the sole variants described in the foregoing, those skilled in the art being in particular capable of isolating or freely combining any of the aforementioned features with each other, or substituting them with equivalents.

The invention claimed is:

1. A cycloidal gear reducer comprising
an input shaft, mounted in rotation in a reducer casing according to a main axis,
an eccentric member carried by the input shaft and driven in rotation by the input shaft, and
an output shaft, distinct from the input shaft,
wherein the reducer includes two reduction stages, including a first reduction stage that comprises
the eccentric member,
an input disk that is cycloidal, that is mounted in rotation on the eccentric member, that comprises a first cycloidal toothing, and
an input rim that is secured to the reducer casing and that comprises first cycloidal receiving toothing on which the first cycloidal toothing of the input disk meshes; and
a second reduction stage that comprises
an output disk that is cycloidal, that is secured in rotation to the input disk, and comprises a second cycloidal toothing, and
an output rim that is distinct from the input rim, that is secured in rotation to the output shaft, and that comprises a second cycloidal receiving toothing on which the second cycloidal toothing of the output disk meshes;
wherein the first reduction stage comprises a first suspension device which provides at least one radial elastic adjustment of backlash between the input disk and the input rim; and
wherein the second reduction stage comprises a second suspension device, distinct from the first suspension device, and which provides at least one radial elastic adjustment of backlash between the output disk and the output rim.

2. The reducer according to claim 1, wherein the first suspension device and the second suspension device are carried by the input shaft and interposed radially between the input shaft and respectively the input disk and the output disk.

3. The reducer according to claim 1, wherein at least one of the first suspension device and the second suspension device comprises at least one annular elastic member, which provides a multidirectional radial suspension about the main axis.

4. The reducer according to claim 1, wherein at least one of the first suspension device and the second suspension device has a useful elastic radial stroke which is equal to or larger than 0.05 mm.

5. The reducer according to claim 1, wherein at least one of the first suspension device and the second suspension device comprises at least one metallic elastic member forming a spring and at least one elastic member made of elastomeric material forming a damper.

6. The reducer according to claim 1, wherein the input disk is coupled to the output disk by a coupling joint, such that the input disk and the output disk are secured in rotation about the main axis, but have a translational freedom relative to each other in two radial directions, perpendicular to each other, and wherein the first suspension device is interposed radially between the input shaft and the input disk, whereas the second suspension device is interposed radially between the input shaft and the output disk, so as to dissociate, on either side of the coupling joint, the radial elastic suspension action of the first reduction stage from the radial elastic suspension action of the second reduction stage.

7. The reducer according to claim 1, wherein the input disk and the output disk are both mounted in rotation on the eccentric member by a common eccentric bearing, wherein a coupling joint is formed by a coupling washer which is interposed axially between the input disk and the output disk, around the common eccentric bearing, the coupling washer cooperating with the input disk by at least one first set of slots and tabs and respectively with the output disk by a second set of slots and tabs, the second set of slots and tabs intersecting orthogonally with respect to the first set so as to define two degrees of freedom in radial translation, and wherein the first suspension device comprises at least one first elastic member, interposed radially between the common eccentric bearing and the an input disk, and located axially on a first side with respect to the coupling washer, whereas the second suspension device comprises at least one second elastic member, interposed radially between the common eccentric bearing and the output disk, and located axially on a second side, opposite to the first side, with respect to the coupling washer.

8. The reducer according to claim 1, wherein the cycloidal toothing of the input disk and/or the output disk and the corresponding receiving toothing of respectively the input rim and/or the output rim are helical.

9. A power steering system comprising an assist motor, a steering mechanism allowing modifying the steering angle of one or more steering member, the power steering system comprising a cycloidal reducer according to claim 1 in order to provide a mechanical transmission between the assist motor and the steering mechanism.

* * * * *